United States Patent [19]

Yagi et al.

[11] Patent Number: 4,662,416
[45] Date of Patent: May 5, 1987

[54] PASSENGER CAR PNEUMATIC TIRE EXCELLENT IN CORNERING STABILITY

[75] Inventors: Akira Yagi, Tokyo; Tatsuro Shimada, Musashimurayama, both of Japan

[73] Assignee: Bridgestone Corporation, Tokyo, Japan

[21] Appl. No.: 789,903

[22] Filed: Oct. 21, 1985

[30] Foreign Application Priority Data

Nov. 6, 1984 [JP] Japan ................ 59-232514

[51] Int. Cl.⁴ .............................. B60C 3/04
[52] U.S. Cl. ................ 152/209 R; 152/454
[58] Field of Search ........... 152/454, 209 R, 209 NT, 152/209 D, 548

[56] References Cited

U.S. PATENT DOCUMENTS

| 4,328,850 | 5/1982 | Uemura | 152/454 |
| 4,343,341 | 8/1982 | Jackson | 152/454 |
| 4,393,912 | 7/1983 | Gouttebessis | 152/454 |
| 4,427,046 | 1/1984 | Balbis et al. | 152/209 R |
| 4,436,127 | 3/1984 | Balbis et al. | 152/454 |
| 4,445,560 | 5/1984 | Husy | 152/209 R |

Primary Examiner—Donald Czaja
Assistant Examiner—Ramon R. Hoch
Attorney, Agent, or Firm—Sughrue, Mion, Zinn Macpeak & Seas

[57] ABSTRACT

A passenger car pneumatic tire excellent in cornering stability, which is characterized in that the following ratio relations are met when the tire is assembled onto a rim with an internal pressure being filled:

$$0.55 \leq hw/h \leq 0.70$$

$$0.75 \leq tw/w \leq 0.95$$

$$0.17 \leq m/l \leq 0.26$$

in which hw and h are the height of a point P at the maximum width of a carcass line and the maximum height of a tread as measured from the bead base B of the tire; tw and w are a tread width as measured with reference to intersections Q each between an extension of a center crown curve of the tread and an extension of the outer contour line of the shoulder on a section including a meridian line of the tire and the maximum width of the carcass with reference to the maximum width point P, respectively; and l and m are the length of a line segment joining an intersection S between a perpendicular fallen down to the bead base B from the intersection Q and the carcass line with the maximum width point P and the maximum distance from the carcass line to the line segment, respectively, and that the outer contour line of the shoulder is a curve inwardly concaved or a straight line.

6 Claims, 9 Drawing Figures

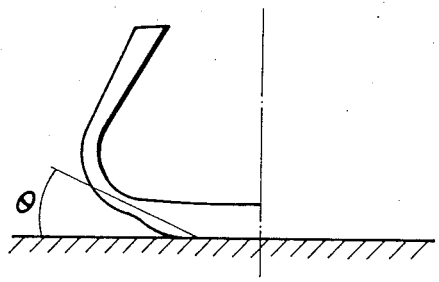
FIG_4
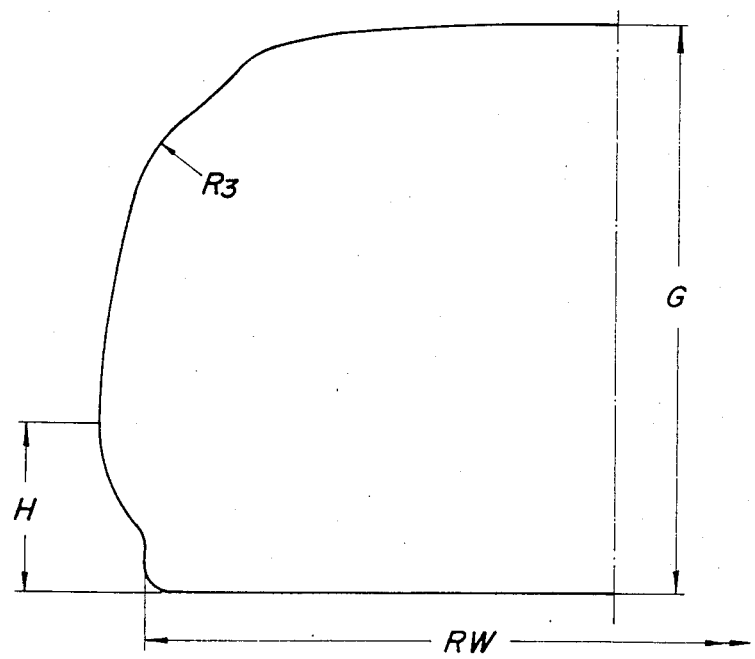
FIG_5

FIG_6
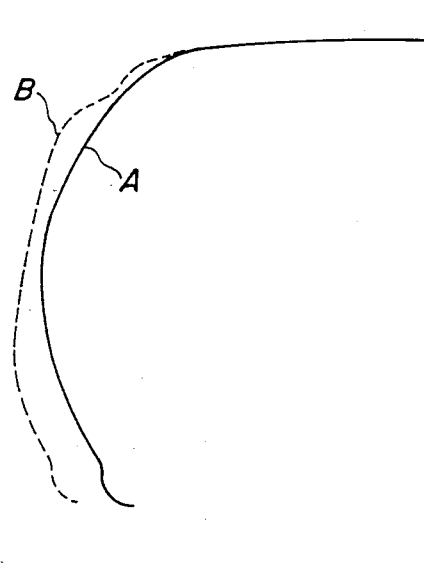
FIG_7
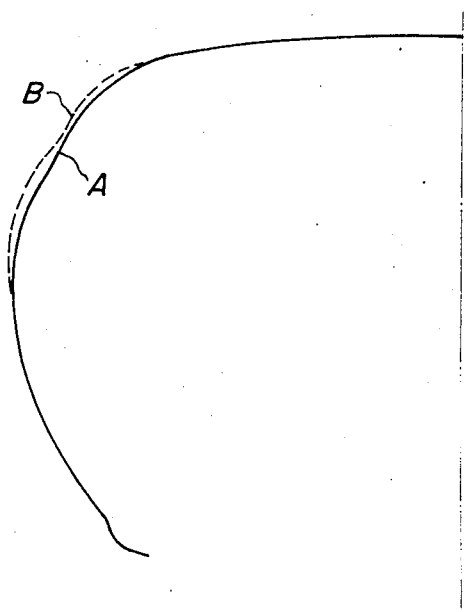
FIG_8
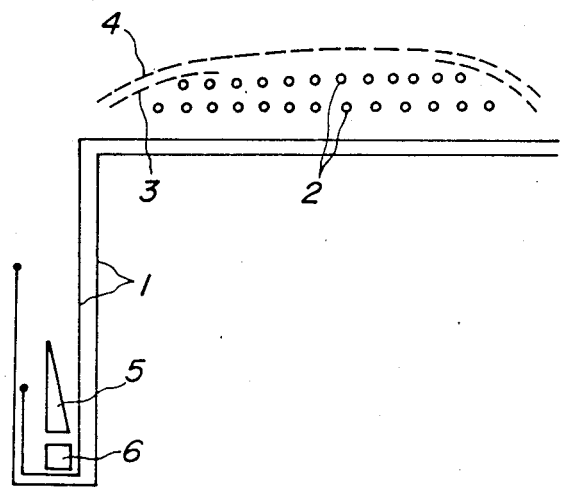

PASSENGER CAR PNEUMATIC TIRE EXCELLENT IN CORNERING STABILITY

BACKGROUND OF THE INVENTION (1) Field of the Invention

The present invention relates to an improvement in a pneumatic tire directed at the cornering stability of passenger cars. In particular, the invention is to provide outercomes of development with respect to effects of the sectional profile and various dimensions of tire upon the cornering stability thereof.

(2) Description of the Related Art

Generally speaking, as a tire achieves higher performance, the rigidity of a belt is increased through the addition of a reinforcing member such as a layer, a cap, etc. onto the belt to enhance durability in high speed running. Thus, the research group including the inventors of this application disclosed in U.S. patent application Ser. No. 708,476 filed on Mar. 5, 1985 that the deformation of the belt is limited under application of a slip angle (hereinafter abbreviated as SA), from the standpoint of the cornering stability, the lateral force (cornering force, in its turn, cornering power) becomes larger at a small steering angle range, and the cornering stability is increased while the slip angle is increased to the intermediate angle.

However, when the CP is increased in such a way, the CF earlier reaches its ceiling upon application of a large SA, so that a rapid CF change is caused at the operation course from the intermediate steering angle to the large steering angle to make the behavior of the vehicle unstable during running.

SUMMARY OF THE INVENTION

It is an object of the present invention to improve the overall cornering stability from the intermediate steering angle to the large steering angle, that is, to appropriately relax the ceiling of the CF through improvement of the sectional profile of the high performance tire with high CP including the tire meridian line.

According to the present invention, there is a provision of a passenger car pneumatic tire excellent in cornering stability, which is characterized in that the following ratio relations are met with reference to FIG. 1 when the tire is assembled onto a rim with an internal pressure being filled:

$$0.55 \leq hw/h \leq 0.70$$

$$0.75 \leq tw/w \leq 0.95$$

$$0.17 \leq m/l \leq 0.26$$

where hw and h are the height of a point P at the maximum width of a carcass line and the maximum height of a tread as measured from the bead base B of the tire; tw and w are a tread width as measured with reference to intersections Q each between an extension of a center crown curve of the tread and an extension of the outer contour line of the shoulder on a section including a meridian line of the tire and the maximum width of the carcass with reference to the maximum width point P, respectively; and l and m are the length of a line segment joining an intersection S between a perpendicular fallen down to the bead base B from the intersection Q and the carcass line with the maximum width point P and the maximum distance from the carcass line to the line segment, respectively, and that the outer contour line of the shoulder is an inwardly concaved curve or a straight line.

These and other objects, features and advantages of the invention will be well appreciated upon reading of the following description of the invention when taken in conjunction with the attached drawings with understanding that some modifications, variations and changes of the invention could be easily done by the skilled in the art to which the invention pertains without departing from the spirit of the invention or the scope of a claim appended hereto.

BRIEF DESCRIPTION OF THE DRAWINGS

For better understanding of the invention, reference is made, to the attached drawings, wherein:

FIG. 4 is a schematic view of an approach angle of a side wall to the ground contact surface;

FIG. 5 is a view of the inner surface of a mold;

FIG. 6 is a view comparing a current tire and a tire according to the present invention in terms of mold profile;

FIG. 7 is a view comparing contour profiles of product tires;

FIG. 8 is a schematic view showing the principal structure of the tire; and

DETAILED DESCRIPTION OF THE INVENTION

Figure 2:
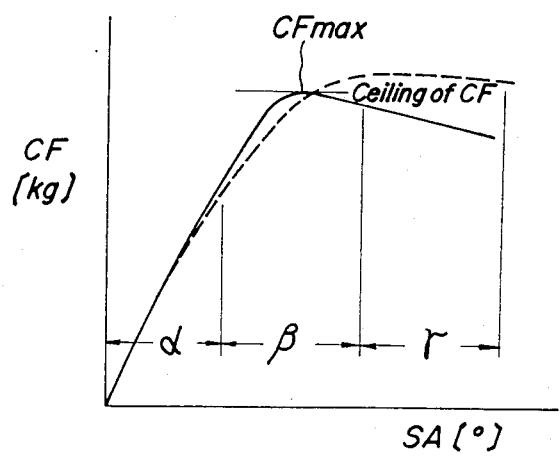
FIG. 2 is a characteristic graph of SA-CF.

The characteristics of SA vs. CF as illustrated in FIG. 2 divided into three portions, $\alpha$ from a small to intermediate steering angle range, $\beta$ from the intermediate to large steering angle range, and $\gamma$ at a large steering angle range. The CF characteristic has an excellent cornering stability just when the CP whch is given by the gradient of the characteristics curve is large, the $CF_{max}$ is high, the ceiling of the CF in the $\beta$ range is slow, and the reduction of CF after the $CF_{max}$ is small with the change of the CF being smooth.

Figure 1:
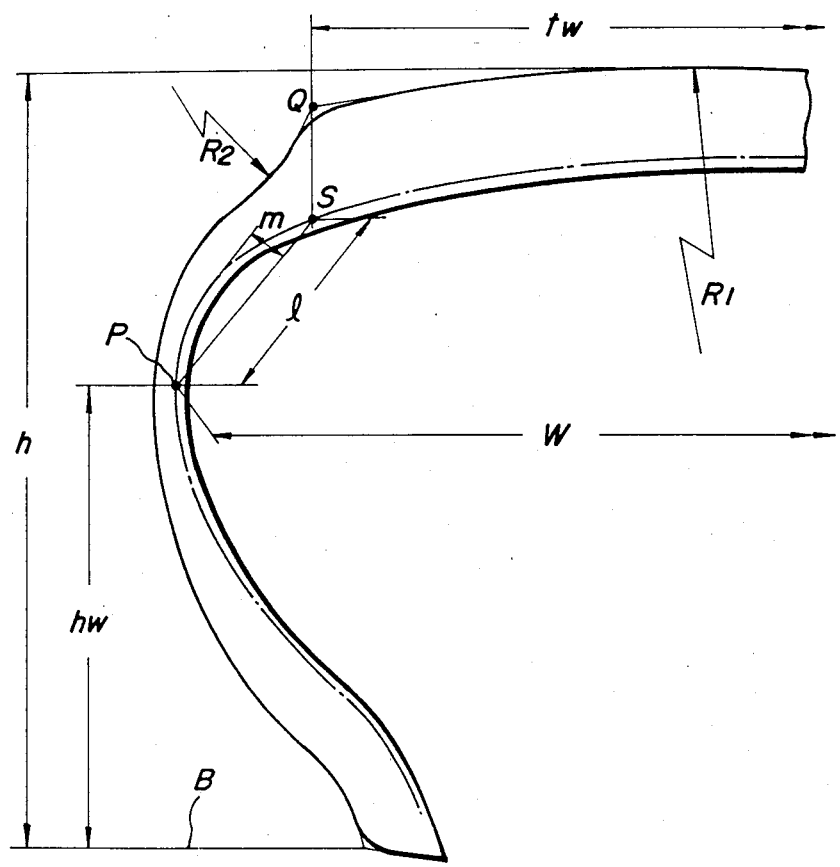
FIG. 1 is a sectional view of a tire.

The characteristics desired in cornering stability can be advantageously realized by imparting the appropriate tire profile as mentioned above. FIG. 1 shows the sectional view of a product tire which is assembled onto a normal rim, and various dimensions shown therein are required to fall in the appropriate ranges given below.

That is, a primary question is that the tire which has a high CP is fast in terms of the ceiling of the CF, and therefore it is necessary that CF increase in the $\beta$ region is continued as long as possible for delaying the ceiling.

The ceiling of CF is closely related to the change in the ground contact surface of the tire.

Figure 3:
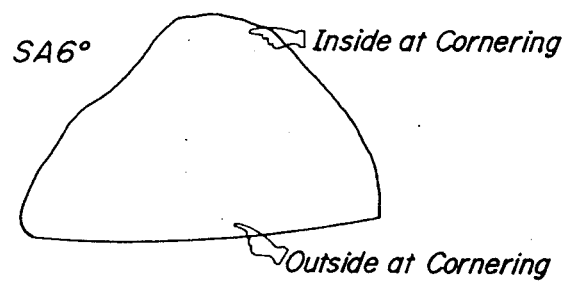
FIG. 3 is a view of illustrating a ground contact profile of the tire.

As shown in FIG. 3 showing an example of the profile of the tire ground contact surface upon application of SA, as the SA becomes larger, the ground contact in the tire circumferential direction outside the cornering is elongated, while the inside of the cornering begins to float, so that the profile of the tire ground contact surface becomes a triangular shape.

If the ground contact property of the triangular shape adhering region between the road and the tire tread rubber on the outside of the cornering, which remains to the and in the vicinity of the $CF_{max}$, is improved, the adhering region can be retained at up to higher SA to retard the ceiling of the CF curve.

In order to improve the ground contact property on the outside of the cornering, it is necessary to weaken the restraint force of belt edges. From the standpoint of the tire profile, it may be that the curvature from the shoulder to the side portion is made larger to lower the initial carcass tension at this portion, the approach angle $\theta$ of a portion of the side wall into the ground contact surface which portion extends from the belt edge to the shoulder as shown in FIG. 4 is made smaller, and the upwardly pulling-up force on the outside of the cornering at the time of the application of SA is made smaller. For this purpose, according to FIG. 1, it must be that $hw/h \geq 0.55$ and $m/l \geq 0.17$. If these values are too larger, problems take place in terms of the durability. Thus, it must be that $hw/h \leq 0.70$, and $m/l \leq 0.26$.

In forming the above-mentioned profile, attention is to be paid to avoid having the side portion approach extremely near the ground in the ground contact width direction.

If the side wall portion approaches too near the ground in the ground contact with direction on the outside of cornering under the application of the SA, there occurs a problem that the tire slips on a tread surface of weak rigidity in the $\gamma$ region, as shown in FIG. 2, to enlarge the degree of the CF reduction. Further, the elongation of the ground contact in the circumferential direction becomes dull to reduce the merit of the shoulder to the side portion assuming the above profile. Therefore, the radius of curvature $R_2$, from the tread edge to the shoulder is required to be a circle with the center point being ouside of the tire, or linear, so that extremely wide ground contact in the tire width direction may be prevented. Since to weaken the initial tension from the shoulder to the side portion leads to reduction in the lateral rigidity and induction of the drop of CP in the $\alpha$ region, the rigidity needs to be compensationally increased by setting the tread at an appropriate width. Therefore, it is necessary that $tw/w \geq 0.75$. If this ratio is too large, it induces the suppression of the elongation of the ground contact in the circumferential direction. Therefore, it must be that $tw/w \leq 0.95$.

As mentioned above, the CF curve in the $\beta$ region can be optimized by specifying the hw/h and m/l, while the CF curve in the $\gamma$ region and in the $\alpha$ region can be optimized by a $R_2$ and tw/w, respectively. Thereby, excellent cornering stability over from a small steering angle to the large steering angle can be obtained.

In order to obtain a product tire with such a configuration, it is necessary to pay special attention in terms of a vulcanization mold in the manufacturing thereof.

In general, according to the vulcanization mold of the tire, the configuration of the tire as mounted onto a rim is considered as a base, and a cavity shape is ordinarily determined by adding some modification thereto.

However, if the above tire configuration is formed by this method, it is impossible from the viewpoint of the manufacture to form the large curvature of carcass line from the shoulder to the side wall, which is the most important point. In order to form this large curvature, as shown in FIG. 5, the bead width Rw is considerably widened with regard to the normal rim width while the curvature at $R_3$ being taken into consideration.

The bead width Rw is preferably from 130 to 155% of the normal rim width. The circle radius $R_3$ in FIG. 5 needs be less than 50 mm to make smaller the initial stage carcass tension of the tire at this portion. But, if the circle radius $R_3$ is less than 30, manufacturing becomes impossible. The difference between the bead width Rw of the mold and the normal rim width being larger is preferably in the curvature of the carcass line from the shoulder to the side portion, but this effect is fully produced by lowering the height of the location of the maximum width of the mold.

Here, the ratio H/G between the height of the location at which the mold is of maximum width and the height of the mold is preferably in a range of 0.17 to 0.37. With the location of the mold maximum width being lowered, the tire has a curvature of a small radius near the rim flange. The tire tends to change into a spontaneously equilibrium profile when being in an inflated state. However, this bead portion has a small outward swelling due to a projection of a small radius and therefore gives the effect that the initial stage tension is small. This effect serves to promote the elongation of the outside of the cornering in a triangular ground contacting shape upon the application of SA.

As mentioned above, the profile of the mold in which the attention is paid in the manufacturing make the portion from the shoulder to the side portion of the tire smaller for the improvement of the ground contact property on the outside of the cornering upon the application of SA produces the similar effect with respect to the tire bead portion to give the tire having an excellent cornering stability as mentioned before.

The invention will be explained more in detail with reference to the following Example, which is merely illustrative of the invention and never interpreted to limit the scope thereof.

(Example and Comparative Example)

There is comparison between the current tire A and a tire B according to the present invention each having a tire size of 215/60 VR 15.

Figure 9:
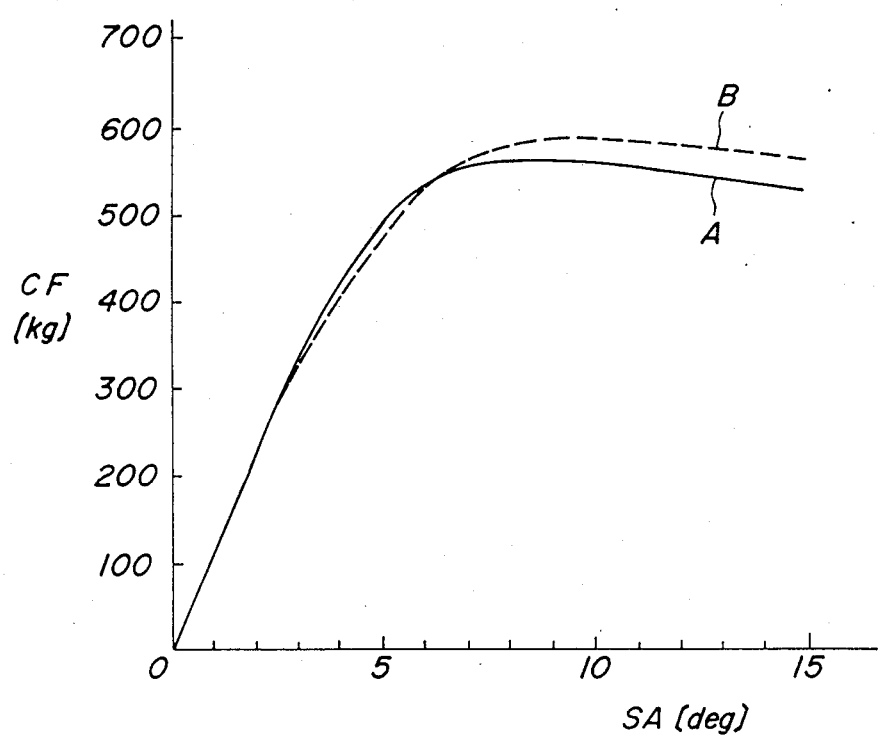
FIG. 9 is a view comparing the SA-CF characteristics.

FIGS. 6 and 7 show difference in the mold profile and difference in the profile of the product tire as assembled into a normal rim, respectively, while FIG. 8 schematically shows the tire structure. In FIG. 8, reference numerals 1, 2, 3, 4, 5, and 6 denote a carcass, a belt, a layer, a cap, a bead filter, and a bead core, respectively. FIG. 9 is a characteristics comparison view of SA-CF.

Results of actual car feeling tests on a sport car are as follows:

|   | Cornering stability | | | |
|---|---|---|---|---|
|   | small steering angle | intermediate steering angle | large steering angle | Vibration, noise |
| A | △ | △ | △ | △ |
| B | ○ | ⊙ | ○ | ○ |

Note:
△ — tolerable
○ — good
⊙ — excellent (Effects of the Invention)

According to the present invention, since the tension of the carcass from the shoulder to the side wall portion is lowered, the deformation when riding over projections under a heavy load becomes milder to give excellent results regarding the cornering stability as well as evaluation on the vibration noise.

What is claimed is:

1. A passenger car pneumatic tire excellent in cornering stability, which is characterized in that the following ratio relations are met when the tire is assembled onto a rim with an internal pressure being filled:

$$0.55 \leq hw/h \leq 0.70$$

$$0.75 \leq tw/w \leq 0.95$$

$$0.17 \leq m/l \leq 0.26$$

in which hw and h are the height of a point P at the maximum width of a carcass line and the maximum height of a tread as measured from the bead base B of the tire; tw and w are a tread width as measured with reference to intersections Q each between an extension of a center crown curve of the tread and an extension of the outer contour line of the shoulder on a section including a meridian line of the tire and the maximum width of the carcass with reference to the maximum width point P, respectively; and l and m are the length of a line segment joining an intersection S between a perpendicular fallen down to the bead base B from the intersection Q and the carcass line with the maximum width point P and the maximum distance from the carcass line to the line segment, respectively, and that the outer contour line of the shoulder is a curve inwardly concaved or a straight line.

2. A passenger car pneumatic tire according to claim 1, wherein the center of curvature of the contour profile from the tread edge to the shoulder is outside the tire.

3. A passenger car pneumatic tire according to claim 1, wherein the contour profile from the tread edge to the shoulder is linear.

4. A passenger car pneumatic tire according to claim 1, wherein a bead width Rw of the tire in a vulcanization mold is wider by 30–55% than that of a normal rim width.

5. A passenger car pneumatic tire according to claim 1, wherein a radius of curvature $R_3$ from the shoulder to the side wall in a vulcanization mold is from 30 to 50 mm.

6. A passenger car pneumatic tire according to claim 1, wherein the ratio H/G in which H is a height level at which the tire maximum width is located and G is the height of the tire is from 0.17 to 0.37 in a vulcanization mold.

* * * * *